No. 881,681. PATENTED MAR. 10, 1908.
S. J. HARDIN & B. F. NORCROSS.
SOIL PULVERIZER.
APPLICATION FILED JULY 31, 1907.

2 SHEETS—SHEET 2.

Samuel J. Hardin
Bertie F. Norcross,
Inventors

Witnesses

By C. A. Snow & Co.
Attorneys

UNITED STATES PATENT OFFICE.

SAMUEL J. HARDIN AND BERTIE F. NORCROSS, OF BEATRICE, NEBRASKA.

SOIL-PULVERIZER.

No. 881,681.   Specification of Letters Patent.   Patented March 10, 1908.

Application filed July 31, 1907. Serial No. 386,406.

*To all whom it may concern:*

Be it known that we, SAMUEL J. HARDIN and BERTIE F. NORCROSS, citizens of the United States, residing at Beatrice, in the county of Gage and State of Nebraska, have invented a new and useful Soil-Pulverizer, of which the following is a specification.

This invention has relation to soil pulverizers adapted to be attached to an agricultural implement frame and it consists in the novel construction and arrangement of its parts as hereinafter shown and described.

The object of the invention is to provide a soil pulverizing attachment which is adapted to be connected with the frame of an agricultural implement such as a plow or lister and the parts of which are so arranged as to effectually operate upon the soil and pulverize the same.

Figure 1:
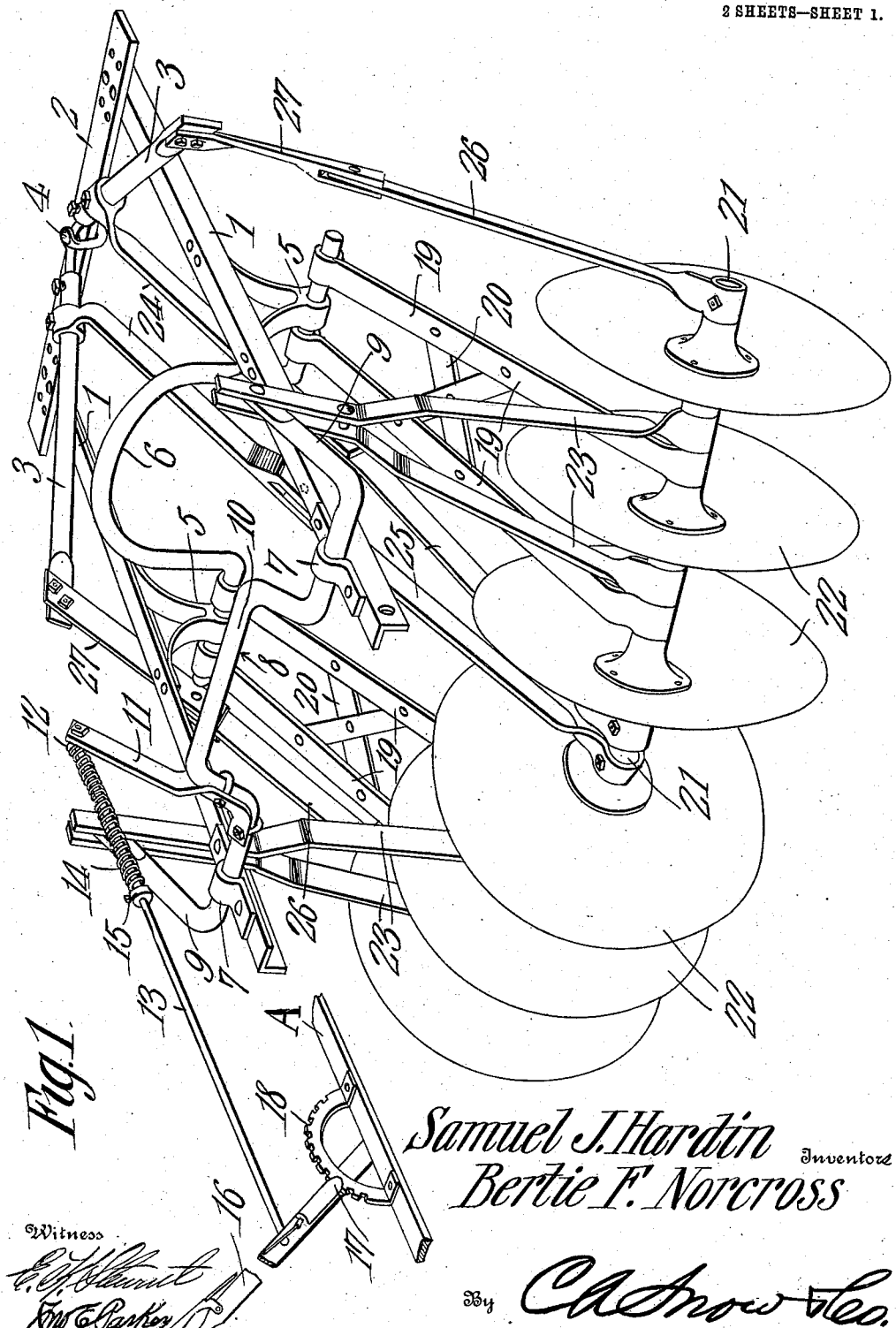
Figure 2:
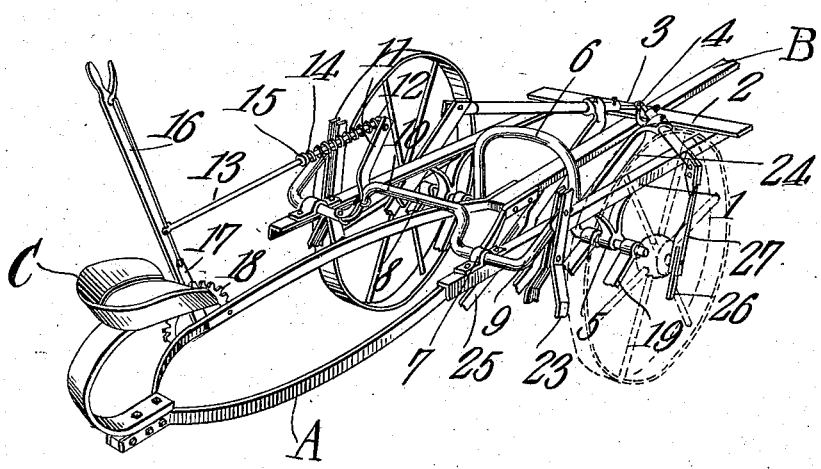

In the accompanying drawings:—Figure 1 is a perspective view of the pulverizer, and Fig. 2 is a perspective view of a portion of the pulverizer applied to a frame.

The frame of the pulverizer consists of the angle iron side bars 1, 1 which are connected together at their forward ends by the cross bar 2. The V-shaped bar 3 is attached to the cross bar 2 by means of a bolt 4 and lies upon the said cross bar 2 with its end portion extending diagonally across the side bars 1. Said bar is made up of pipe end sections which adjustably receive an angular middle section. The side bars 1 are provided with the depending brackets 5 which receive the end portions of the arch bar 6. The rear end portions of the side bars 1 are provided with the bearings 7 in which the crank shaft 8 is journaled. The shaft 8 is provided at its extremity with the crank ends 9 and at its middle with an arched portion 10 which is adapted to lie over the frame of the implement to which the pulverizer is attached. The arm 11 is attached to the shaft 8 and is provided with an eye 12. The rod 13 passes through said eye and the coil spring 14 surrounds the rod 13 and bears at one end against the eye 12 and at its opposite ends against an adjustable collar 15 mounted upon a rod 13. The rod 13 is connected with the lever 16 which is fulcrumed upon a frame A to which the pulverizer is attached. The lever 16 is provided with a spring actuated pawl 17 which operates upon the gear segment 18 also attached to the frame A. The arms 19 are journaled at their forward ends to the end portions of the arch bar 6 and are located upon opposite sides of the brackets 5. The cross braces 20 connect the arms 19 together upon each side of the pulverizer, whereby, the said arms are grouped into sets. The lower ends of each set of arms 19 is attached to a gang shaft 21 upon which is mounted for rotation a gang of disks 22. The binate links 23 are pivotally connected at their upper ends to the crank ends 9 of the shaft 8 and are connected at their lower ends with the shaft 21 with one of the disks 22 located between the lower ends of the said links 23. The arms 24 are attached at their upper ends to the V-shaped bars 3 in the vicinity of the apex thereof and extend down within the side bars 1 and the arms 25 are pivotally attached to the lower ends of the arms 24 substantially in alinement with the connection between the arms 19 and the arch bar 6. The lower ends of the arms 25 are attached to the inner ends of the shafts 21. The arms 27 depend from the extremities of the V-shaped bar 3 and are inclined toward the shafts 21. The arms 26 are pivotally connected to the arms 27 substantially in alinement with the connection between the arms 19 and the arch bar 6. The arms 27 and 26 are located beyond the outer side of the side bars 1 and the lower end of the arms 26 are connected with the outer ends of the gang shafts 21.

The frame A to which the attachment is connected may be that of a plow or lister from which the beams are removed. The tongue B is attached to said frame A as is also the seat C. The attachment herein described is connected to the tongue B by the bolt 4 which also connects the bar 3 to the bar 2.

From the foregoing description it is obvious that when the pulverizer is so connected to a frame A the lever 16 may be manipulated in order to rock the shaft 8, whereby, the disks 22 will be held in engagement with the soil under tension of the spring 14 and when the disks engage obstructions they will ride over the same inasmuch as the eye 12 may slide longitudinally of the rod 13. At the same time the said disks will pulverize and level the surface of the soil.

Having described my invention what I claim as new and desire to secure by Letters-Patent is:—

A pulverizing attachment for agricultural implements comprising a frame, an arched bar attached to the frame, a shaft journaled to the frame and having crank extremities with an arched intermediate portion, a lever mechanism for turning said shaft, a V-shaped bar mounted upon the frame, arms depending from said V-shaped bar, arms pivotally connected to said depending arms, arms journaled upon the end portions of the arch bar, shafts attached to the lower ends of the last said arms, disks journaled for rotation upon said shafts, and links pivotally connecting the crank ends of the first said shaft with the disk bearing shafts.

In testimony that we claim the foregoing as our own, we have hereto affixed our signatures in the presence of two witnesses.

SAMUEL J. HARDIN.
BERTIE F. NORCROSS.

Witnesses:
J. P. SAUNDERS,
G. E. EMERY.